United States Patent [19]

Lines et al.

[11] Patent Number: 4,790,619
[45] Date of Patent: Dec. 13, 1988

[54] APPARATUS COMPRISING RAMAN-ACTIVE OPTICAL FIBER

[75] Inventors: Malcolm E. Lines, Millington; Kenneth B. Lyons, Clinton Township, Hunterdon County; Anne E. Miller, Westfield; Kurt Nassau, Bernardsville, all of N.J.

[73] Assignee: American Telephone and Telegraph Company, AT&T Bell Laboratories, Murray Hill, N.J.

[21] Appl. No.: 856,165

[22] Filed: Apr. 25, 1986

[51] Int. Cl.[4] ........................ G02B 6/16; G02F 1/39
[52] U.S. Cl. ............................ 350/96.16; 350/96.29; 350/96.34
[58] Field of Search ............... 350/96.34, 96.30, 96.15, 350/96.16, 96.29; 356/350

[56] References Cited

U.S. PATENT DOCUMENTS

| 4,401,364 | 8/1983 | Mochizuki | 350/96.16 |
| 4,558,921 | 12/1985 | Hasegawa et al. | 350/96.29 |
| 4,616,898 | 10/1986 | Hicks, Jr. | 350/96.33 X |

FOREIGN PATENT DOCUMENTS 0146262 11/1984 European Pat. Off. .
56-70683 12/1981 Japan .

OTHER PUBLICATIONS

Bulmer et al., "Fiber Gyroscope with Nonreciprocally Operated, Fiber-Coupled LiNbO3Phase Shifter", *Optics Letters*, V. 6, No. 11, Nov. 1981, pp. 572-574.
Moslehi et al., "Fiber-Optic Lattice Signal Processing", *Proceedings of the IEEE*, V. 72, No. 7, Jul. 1984, pp. 909-930.
*Optical Fiber Telecommunications*, (1979) by S. E. Miller and A. G. Chynoweth, pp. 127-133.
*IEEE Journal of Quantum Electronics*, vol. QE-22, No. 1, Jan. 1986, "Soliton Propagation in Long Fibers with Periodically Compensated Loss" by L. F. Mollenauer et al, pp. 157-173.
*Electronics Letters*, vol. 19, No. 19, Sep. 15, 1983, "High--Gain Optical Amplification of Laser Diode Signal by Raman Scattering in Single-Mode Fibers" by E. Desurvire et al, pp. 751-753.
*Journal of Optical Communications*, 4, (1983) "Designing Optical Fibers for Frequency Conversion and Optical Amplification by Stimulated Raman Scattering and Phase-Matched Four-Photon Mixing" by C. Lin, pp. 2-9.
*Electronics Letters*, Aug. 15, 1985, vol. 21, No. 17, "Raman Amplification in Fluoride Glass Fibres" by Y. Durteste et al, pp. 723-724.
*Journal of the American Ceramic Society*, vol. 65, No. 10, Oct. 1982, "Glass-Forming Systems Involving $GeO_2$ with $Bi_2O_3$, $Tl_2O$, and $PbO$" by K. Nassau et al, pp. 486-491.
*Optics Letters*, vol. 10, No. 2, Feb. 1985, "Raman Amplication of Recirculating Pulses in a Reentrant Fiber Loop", by E. Desurvire et al, pp. 83-85.
*Applied Optics*, vol. 21, No. 23, Dec. 1, 1982, "Optical Properties of New Oxide Glasses with Potential for Long-Wavelength Optical Fibers" by D. L. Wood et al, pp. 4276-4279.

*Primary Examiner*—John D. Lee
*Attorney, Agent, or Firm*—Eugen E. Pacher

[57] ABSTRACT

Raman-active optical fiber having very large Raman cross section is disclosed. The fiber comprises glass that has two major components, a glass-forming first component ($GeO_2$, $SiO_2$, $AsO_{1.5}$, or combinations thereof) and a heavy metal oxide second component (PbO, $BiO_{1.5}$, $SbO_{1.5}$, $TlO_{0.5}$, or combinations thereof), with the first and second major components making up at least 70 mol %, preferably at least 90 mol %, of the glass. The maximum relative Raman cross section $\sigma_r$ of the inventive glass is at least 15, preferably greater than 20, where $\sigma_r = \sigma_{RA}/\sigma_{SiO_2}$, and where $\sigma_{RA}$ and $\sigma_{SiO_2}$ are the maximum 0° K. Raman cross sections of the inventive glass and of pure vitreous $SiO_2$, respectively. Fiber according to the invention can advantageously be used in apparatus such as optical fiber communications systems, information processing systems that contain an optical fiber memory loop, and optical fiber sensors.

12 Claims, 4 Drawing Sheets

APPARATUS COMPRISING RAMAN-ACTIVE OPTICAL FIBER

FIELD OF THE INVENTION

This invention pertains to apparatus that comprises Raman-active optical fiber adapted for amplification of electromagnetic radiation by means of stimulated Raman scattering. Exemplarily, such apparatus can be an optical fiber communication system, an information processing system such as an optical computer, or an optical sensor system.

BACKGROUND OF THE INVENTION

It has been known for some time that optical fibers can be advantageously used to amplify, by means of stimulated Raman scattering (SRS), radiation guided through the fiber. See, for instance, *Optical Fiber Telecommunications*, S. E. Miller and A. G. Chynoweth, editors, Academic Press, 1979, pages 127–133, incorporated herein by reference. Various optical fiber communications systems that use Raman amplification of the signal have been proposed. An exemplary system is disclosed, for instance, in U.S. Pat. No. 4,558,921.

Essentially all optical fiber used today for transmission purposes is silica-based fiber. Since silica, or silica lightly doped with other elements such as germanium, is known to have a non-zero Raman cross section, it is possible to use the normal transmission fiber also for amplification purposes, and systems of this type have been proposed. See, for instance, L. F. Mollenauer et al, *IEEE Journal of Quantum Electronics*, Vol. QE-22(1), pages 157–173 (1986), and U.S. Pat. No. 4,401,364.

Another approach to the design of an optical fiber communications system with Raman amplification is to use ordinary low-loss transmission fiber in conjunction with one or more lengths of Raman-active fiber that differ in composition from the low-loss transmission fiber. In this case, the signal amplification is not distributed over essentially the whole length of the transmission path but is substantially localized in the Raman-active fiber sections. The Raman cross section of the Raman-active fiber typically is substantially larger than the Raman cross section of the low-loss transmission fiber. A convenient figure of merit for Raman-active fiber is the relative Raman cross section $\sigma_r = \sigma_{RA}/\sigma_{SiO_2}$, where $\sigma_{RA}$ is the Raman cross section of the Raman-active fiber, and $\sigma_{SiO_2}$ is the maximum Raman cross section of pure silica glass.

The prior art knows some Raman-active optical fibers whose $\sigma_r$ is substantially greater than 1. For instance, E. Desurvire et al, *Electronics Letters*, Vol. 19(19), pages 751–753 (1983), report optical amplification of 1.24 μm radiation in $GeO_2$—$SiO_2$ single mode fiber. Since it is known that $\sigma_r$ of pure $GeO_2$ is about 10, it is evident that the $\sigma_r$ of $GeO_2$—$SiO_2$ fiber will be less than 10. Use of $GeO_2$—$SiO_2$ fibers or $GeO_2$ fibers is also taught in European patent application No. 0146262.

C. Lin, *Journal of Optical Communications*, Vol. 4(1), pages 2–9 (1983), discusses the design of optical fibers for, inter alia, optical amplification by SRS, and discloses that $P_2O_5$ has a $\sigma_r$ of about 5.

Japanese Pat. No. 56-70683 discloses Raman-active optical fiber that comprises a $SiO_2$—$P_2O_5$—$GeO_2$ glass core surrounded by a clad layer having the same constituents but lower refractive index, and Y. Durteste et al, *Electronics Letters*, Vol. 21(17), pages 723–724 (1985) report on Raman amplification in fluoride glass fibers.

Prior art Raman-active optical fiber typically has $\sigma_r$ that is substantially less than 15. Thus, any optical fiber system that uses prior art Raman-active fiber to amplify the signal has to comprise relatively long lengths of the Raman-active fiber and/or use relatively high pump power levels. Having available Raman-active optical fiber having larger Raman cross section than prior art fiber would permit the use of shorter Raman amplifier sections and/or lower pump power levels, resulting in lower system cost and complexity. This application discloses high Raman cross section fiber, together with apparatus that comprises such fiber.

Various nonsilica-based glass systems have recently been investigated to determine their suitability in ultra low loss transmission fibers. Among these were glasses containing $GeO_2$ and heavy metal oxides such as $Bi_2O_3$, $Tl_2O$, $PbO$, and $Sb_2O_3$. See, for instance, K. Nassau et al, *Journal of the American Ceramic Society*, Vol. 65(10), pp. 486–491 (1982), and D. L. Wood et al, *Applied Optics*, Vol. 21(23), pp. 4276–4279 (1982). These investigations have led to the general conclusion that such heavy metal oxide glasses may have potential for low loss transmission waveguide fiber for the long wavelength region (e.g., 2–4 μm) if ultra high purity glass can be prepared.

GLOSSARY AND DEFINITIONS

An "optical fiber" herein is an elongated dielectric body comprising a core and a cladding surrounding the core, adapted for guiding electromagnetic radiation of a given wavelength $\lambda_s$, the "signal radiation". At least the core of the optical fiber consists of glass. At $\lambda_s$ the effective refractive index of the core is greater than the cladding refractive index.

"Stimulated Raman Scattering (SRS)" is a process that results in the transfer of energy from a "pump" radiation of wavelength $\lambda_p$ to the signal radiation, thereby producing amplification of the signal. Typically $\lambda_p < \lambda_s$, with the frequency difference between signal and pump radiation referred to as the Stokes shift $\Delta\nu$ (typically expressed in $cm^{-1}$). The intensity of SRS in a given material, for a given pump intensity, Stokes shift and interaction length, is a function of the "Raman cross section" $\sigma_{RA}(\Delta\nu)$ and of the temperature.

The "relative Raman cross section" $\sigma_r(\Delta\nu)$ of a given material herein is the ratio of the 0° K. Raman cross section of the material for the Stokes shift $\Delta\nu$ to the maximum 0° K. Raman cross section of vitreous $SiO_2$. The maximum in the $SiO_2$ Raman cross section occurs at about $\Delta\nu = 420$ $cm^{-1}$.

By "Raman-active" optical fiber we mean herein fiber having $\sigma_r > 1$. Typically such fiber has $\sigma_r > 15$.

SUMMARY OF THE INVENTION

It is an object of this invention to provide a Raman-active optical fiber of very high Raman cross section. It is a further object of the invention to provide apparatus that comprises Raman amplification of electromagnetic radiation, and that incorporates the high Raman cross section optical fiber according to the invention.

In particular, it is an object of the invention to provide a communications system that comprises optical fiber according to the invention, to provide an information processing system comprising optical fiber information storage means that comprises Raman-active fiber according to the invention, and to provide measuring and/or sensing apparatus that comprises Raman amplification means, including Raman-active fiber according to the invention.

Apparatus according to the invention typically comprises a source of electromagnetic signal radiation, optical fiber forming a transmission path for the signal radiation from a first fiber location to a second fiber location, means for coupling the signal radiation into the fiber at the first location, and signal radiation-responsive means at the second fiber location. Furthermore, such apparatus comprises Raman amplification means for the signal radiation, with the Raman amplification means comprising a length of Raman-active optical fiber that forms at least a part of the transmission channel for the signal radiation.

At least the core of the inventive Raman-active optical fiber consists of glass comprising a glass-forming first major component and a heavy metal oxide second major component, the first and second major components together being at least about 70 mol%, preferably at least 90 mol%, of the core material (all compositional percentages herein are mol percent, unless stated otherwise). The first major component is chosen from the group consisting of $GeO_2$, $SiO_2$, $AsO_{1.5}$, and combinations thereof, and the second major component is selected from the group consisting of $PbO$, $BiO_{1.5}$, $SbO_{1.5}$, $TlO_{0.5}$, and combinations thereof.

The above chemical formulae refer to the constituents of the glass. The starting materials used in the manufacture of the glass may, however, have different formulae. For example, the use of Tl in the form of $Tl_2O_3$ starting material results in the presence of $TlO_{0.5}$ in the melt and the glass formed therefrom. It is also to be noted that some compounds herein may be interchangeably referred to by their conventional formula (e.g., $Bi_2O_3$) and by their equivalent single cation formula (e.g., $BiO_{1.5}$).

The relative Raman cross section for the signal radiation in the Raman-active optical fiber according to the invention is at least about 15, and preferably is greater than 20. Typically, the first major component is between about 25 and about 60% of the core of the fiber.

In preferred embodiments, the Raman-active optical fiber also comprises a glass cladding, with the cladding material also comprising the first and second major components, which together make up at least about 70%, preferably at least 90%, of the cladding. The core and cladding compositions are selected such that the effective refractive index of the core is greater than that of the cladding by a predetermined amount. Frequently, the first and second major components make up substantially all of the core material and of the cladding material.

In two exemplary preferred embodiments, the average composition of the core material is about $40GeO_2 30BiO_{1.5} 30PbO$ and $60GeO_2 40SbO_{1.5}$, respectively. The numerical factors are understood to be mol percent. Currently preferred compositional ranges in the $GeO_2$—$BiO_{1.5}$—$PbO$ system and the $GeO_2$—$SbO_{1.5}$—$BiO_{1.5}$ system are depicted in FIGS. 1 and 2, respectively.

Substitution of $SiO_2$ for some or all of $GeO_2$ generally results in a decrease of the Raman cross section of the fiber. On the other hand, the addition of $SiO_2$ results in a more viscous melt, which in turn makes for easier fiber drawing and reduces the likelihood of crystalization. We currently consider that the amount of $SiO_2$ present in the core of the inventive fiber should not exceed 50% of the core material, and preferably not exceed 50% of the first major component in the core.

A preferred use of Raman-active optical fiber according to the invention is in optical fiber telecommunications systems. In such systems, the inventive fiber can, for instance, be incorporated into the long haul trunk portion of the system, to compensate for signal attenuation due to loss in the fiber. It can also be used in the distribution and/or customer loop portion to compensate for, inter alia, signal loss due to taps that divert signal energy into side branches of the network and/or into subscriber stations. Use of fiber according to the invention is also envisaged in local area networks and other private networks.

Raman-active fiber according to the invention also can advantageously be used in information processing apparatus in which the signal is, during at least part of the processing thereof, in optical form. If such apparatus comprises an optical fiber transient memory loop, then fiber according to the invention advantageously is incorporated into the optical fiber loop such as to compensate for signal attenuation in the loop.

Fiber according to the invention also can be advantageously used in optical fiber sensing and/or measuring apparatus. Exemplary of such apparatus are optical fiber rotation sensors, accelerometers, thermometers, strain sensors, pressure sensors, pollution detectors, and magnetometers.

All apparatus according to the invention comprises, in addition to one or more sources of signal radiation, one or more sources of pump radiation of appropriate wavelength and power.

DETAILED DESCRIPTION

A central aspect of this invention is the provision of optical fiber having a relatively large $\sigma_r$ of typically at least about 15, and preferably as large as 20 or even 30. The inventive fibers comprise glass not previously known to have large Raman cross section, and thus to have advantageous uses in Raman amplification of electromagnetic radiation.

THE FIBER

Glasses according to the invention have two major components, the first being a glass-former component ($GeO_2$, $SiO_2$, $AsO_{1.5}$, or combinations thereof), the second being a heavy metal oxide component ($PbO$, $BiO_{1.5}$, $SbO_{1.5}$, $TlO_{0.5}$, or combinations thereof). The two major components together account for at least 70%, preferably at least 90%, of the Raman-active fiber core, frequently making up substantially all of the core, or all of the fiber.

Figure 1:
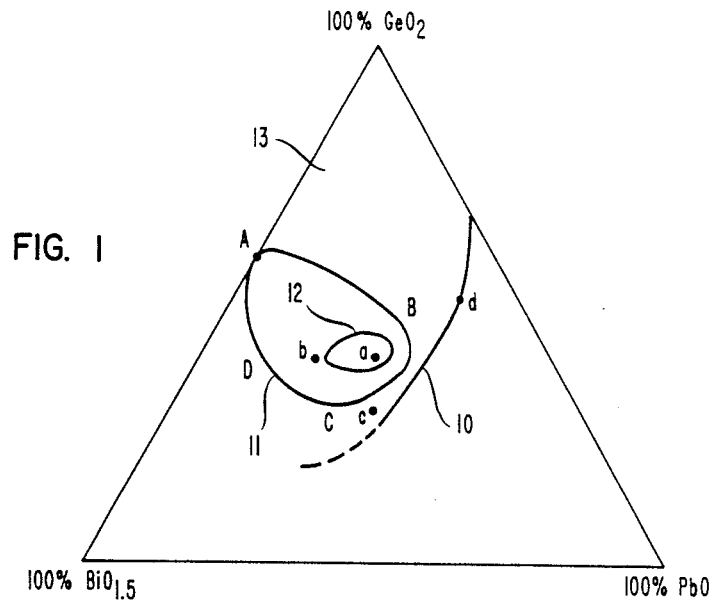
FIG. 1 shows the compositional diagram of the $GeO_2$—$BiO_{1.5}$—$PbO$ system, outlining a composition regime useful in the practice of the invention.

FIG. 1 shows the phase diagram of an exemplary ternary system, the $GeO_2$—$BiO_{1.5}$—$PbO$ system. Line 10 is the boundary of the glass-forming region 13, and lines 11 (ABCDA) and 12 enclose those compositions for which the relative Raman cross section is at least about 20 and 30, respectively. The relative Raman cross sections at a, b, c, and d are 36, 27, 16 and 15, respectively. Point a corresponds approximately to the composition with highest relative Raman cross section in this particular ternary system.

Figure 2:
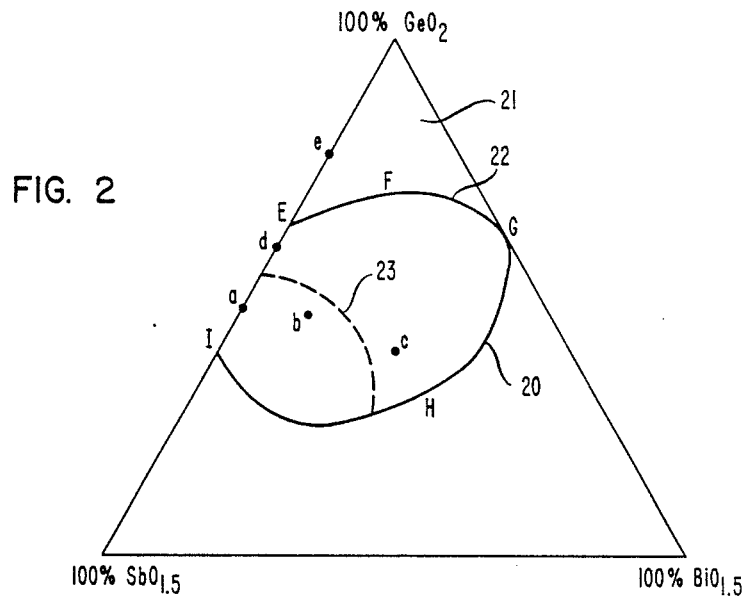
FIG. 2 similarly shows the compositional diagram of the $GeO_2$—$SbO_{1.5}$—$BiO_{1.5}$ system.

FIG. 2 depicts a similar phase diagram for the $GeO_2$—$SbO_{1.5}$—$BiO_{1.5}$ system. Line 20 (GHI) is the boundary of the glass-forming region, and line 22 (EFG) is the $\sigma_r \sim 20$ contour. Line 23 is the $\sigma_r \sim 25$ contour, and points a, b, c, d, and e are compositions having $\sigma_r$ of 30, 27, 24, 21, and 18, respectively.

Typically, replacement of some $GeO_2$ by $SiO_2$ results in somewhat lower $\sigma_r$. For instance, for compositions according to FIG. 2 but with 10% $SiO_2$ replacing 10% $GeO_2$, the $\sigma_r$ at point b is 22, and at the intersection of line 22 with the zero-$BiO_{1.5}$ axis $\sigma_r$ is 17.

The $GeO_2$—$BiO_{1.5}$—$PbO$ and $GeO_2$—$SbO_{1.5}$—$BiO_{1.5}$ systems (with or without $SiO_2$ replacing some of the $GeO_2$) are examples of glasses having only one dominant peak in the Raman spectrum. Such glasses are currently preferred by us. However, for some applications it may be advantageous to use a glass having two or more strong Raman peaks, and in such cases members of other glass systems according to the invention may be preferred.

Figure 3:
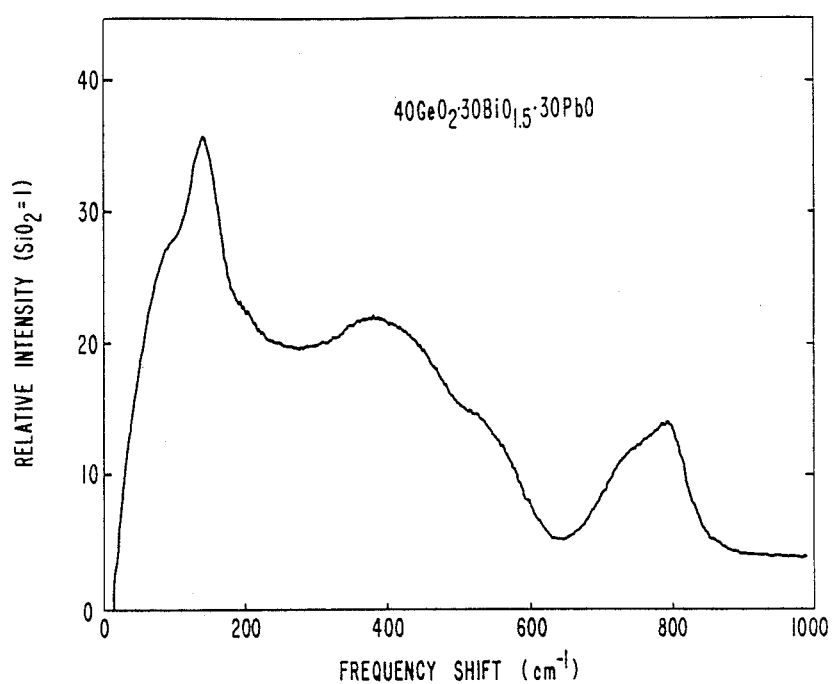
FIGS. 3 and 4 show the relative Raman cross sections, as a function of Stokes frequency shift, of two preferred exemplary glass compositions.
Figure 4:
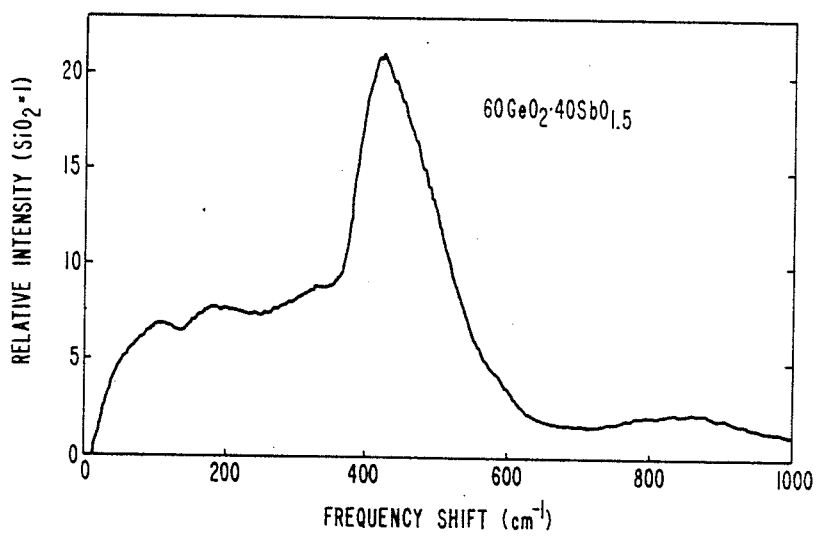

FIGS. 3 and 4 show the Raman spectra of two exemplary inventive Raman-active glasses. As can be seen, glass of composition $40GeO_2 \cdot 30BiO_{1.5} \cdot 30PbO$ has maximum $\sigma_r$ at a Stokes shift of about 140 cm$^{-1}$, whereas in $60GeO_2 \cdot 40SbO_{1.5}$ glass the maximum occurs at about 420 cm$^{-1}$.

Figure 5:
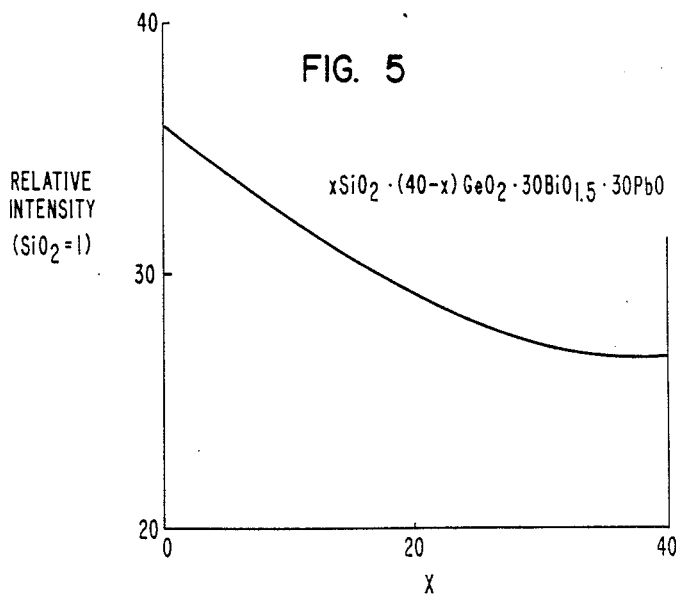
FIG. 5 exemplifies the effect of the substitution of $SiO_2$ for $GeO_2$ on the Raman cross section in Raman-active glass according to the invention.

FIG. 5 further illustrates the effect of $GeO_2/SiO_2$ substitution, for glasses of composition $xSiO_2 \cdot (40-x)GeO_2 \cdot 30BiO_{1.5} \cdot 30PbO$. The relative Raman cross section at 140 cm$^{-1}$ frequency shift decreases from about 36 for x=0 to about 27 at x=40%. However, since addition of $SiO_2$ typically results in improved processing characteristics of the glass, it may frequently be found desirable to use $SiO_2$-containing glass according to the invention.

Fiber according to the invention can be produced by any appropriate method, e.g., by melting of the constituents in an inert vessel such as a platinum crucible, and drawing of fiber directly from one or more orifices in the crucible. Although typically inventive fiber comprises both a glass core and a glass cladding surrounding the core, the invention can also be practiced with optical fiber that has a glass core and a non-glass (e.g., polymer) cladding. An advantageous known method for producing the former type is by means of the double crucible method. However, it is also possible to use other techniques, e.g., to draw the fiber from a preform that was produced by casting of the molten glass into an appropriate mold. Glass preparation, fiber drawing, and possibly other high temperature manufacturing steps may be carried out in air, other oxygen containing gases, or in an appropriate inert gas (e.g., $N_2$, He) atmosphere, depending on, inter alia, the particular constituents used.

Fiber according to the invention can have any desired refractive index profile, including step index and graded index, can have one or more cladding layers, be single mode or multimode, and be incorporated into any appropriate single or multi-fiber cable. If the fiber has both a glass core and cladding then typically both core and cladding contain the same constituents adjusted such as to result in the desired difference between the effective refractive index of the core and of the cladding. However, if desired, e.g., to achieve equality of thermal expansion between core and cladding material, it is possible to add to the core or the cladding a constituent that is not present in the cladding or the core, respectively. Furthermore, it is envisaged that minor amounts (a total of at most 30, preferably <10%) of constituents other than the two previously referred to major components may be present in the inventive fiber. Typically no individual minor constituent is present in an amount >15 or 10%. Such minor constituents might be added to improve, for instance, the processability, mechanical properties, or stability (including radiation resistance) of the glass, or of the fiber produced therefrom.

EXAMPLE 1

Raman-active step index optical fiber is produced by preparing, in a platinum double crucible, a well mixed core melt of composition $30GeO_2 \cdot 10SiO_2 \cdot 30PbO \cdot 30BiO_{1.5}$, and a well mixed cladding melt of composition $27GeO_2 \cdot 13SiO_2 \cdot 30PbO \cdot 30BiO_{1.5}$. After melt formation the double crucible is allowed to cool to about 500° C. and maintained at that temperature in an air atmosphere. Fiber is drawn from the double orifice of the double crucible and, after solidification and cool-down, coated with a polymer. The fiber has an outer diameter of about 125 $\mu$m, a core size of about 8 $\mu$m, a cladding refractive index of about 2.0, and a core/cladding index difference of about 1%. The optical fiber has $\sigma_r \sim 32$ at the signal radiation wavelength 1.550 $\mu$m, with pump radiation of wavelength 1.517 $\mu$m (140 cm$^{-1}$ Stokes shift).

EXAMPLES 2–12

Table I summarizes the glass compositions and results of the Raman measurements of Examples 2–12. Listed are the mol percent of the various glass constituents, and (in addition to the maximum $\sigma_r$) the Stokes shift (in cm$^{-1}$) at which the Raman cross section is a maximum.

The glasses of Examples 2–12 were prepared by ball milling of the constituents, melting the constituents in platinum crucibles in air at about 1100° C., and pouring of the melt into a stainless steel mold. The resulting glass samples were then annealed for one hour at or near the glass transition temperature, cooled at 1° C./min to room temperature, cut, polished, and the Raman spectrum measured by conventional means.

Whereas many of the glass compositions of Examples 2–12 have more than one strong Raman peak the glasses of Examples 9, 10, 11 and 12 show only one strong Raman peak. For instance, the glass of Example 5 has two strong peaks, with the second strongest occurring at $\Delta \nu = 150$ cm$^{-1}$ and having $\sigma_r = 21$.

TABLE I

| Example No. | $GeO_2$ | $SiO_2$ | $AsO_{1.5}$ | $BiO_{1.5}$ | $PbO$ | $SbO_{1.5}$ | $TlO_{0.5}$ | $\sigma_r$ | $\Delta\nu$ |
|---|---|---|---|---|---|---|---|---|---|
| 2 | 60 | | | 40 | | | | 23 | 410 |
| 3 | 60 | | | | | | 40 | 31 | 40 |
| 4 | 50 | | | 25 | 25 | | | 20 | 140 |
| 5 | 40 | | | 30 | | 30 | | 24 | 410 |
| 6 | 40 | | | 30 | | | 30 | 30 | 450 |
| 7 | 40 | | | | 30 | 30 | | 17 | 100 |
| 8 | 40 | | | | 30 | | 30 | 27 | 90 |
| 9 | 40 | | | 20 | 20 | | 20 | 30 | 140 |
| 10 | | 40 | | 30 | 30 | | | 27 | 140 |
| 11 | | | 50 | | | 50 | | 28 | 420 |
| 12 | 48 | | | | | | 52 | 30 | 420 |

THE APPARATUS

Figure 6:
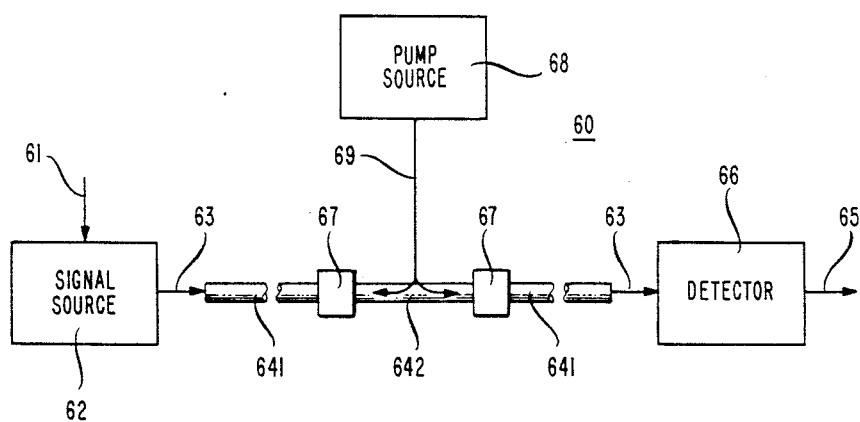
FIG. 6 schematically depicts an optical fiber telecommunications system with Raman amplification.

Raman-active fiber according to the invention can advantageously be used whenever efficient Raman amplification of optical fiber-guided signal radiation (typically in the range 0.5 μm to 4.0 μm) is required. FIG. 6 schematically depicts exemplary apparatus that uses inventive fiber in Raman amplification means, namely, an optical fiber communications system which uses Raman amplification to compensate for the signal attenuation in the transmission path. Signal source 62 (e.g., a semiconductor laser) can be modulated by means of input signal 61. Signal radiation 63 is coupled by means that are not shown (e.g., a lens) into optical transmission fiber 641 (e.g., conventional $SiO_2$-based low loss single mode fiber) that is part of an optical fiber transmission path from the signal source to detector 66, which receives signal radiation 63 and provides an output signal 65.

At least at one intermediate location a length of Raman-active fiber 642 is inserted into the transmission path and coupled to the transmission fibers 641 by any appropriate coupling means 67. Such means are well known in the art and require no discussion. Pump source 68 emits pump radiation 69 which is coupled into the Raman-active fiber by known means that are also not shown.

The pump source can be a single source or it can comprise a battery of sources, e.g., light emitting diodes. The pump radiation can be cw or pulsed, is of shorter wavelength than the signal radiation by an amount that typically corresponds substantially to the Stokes shift that results in maximum Raman scattering, and can be coupled into 642 so as to be co- and/or counter-propagating with the signal radiation. Furthermore, at least in some cases it may be advantageous to provide means for selectively removing pump radiation from the transmission path, to prevent accumulation of pump frequency background radiation. In some long haul communication systems of the type depicted in FIG. 6, it may be desirable to provide, at appropriate intervals along the transmission path, means for reshaping of the signal pulses to prevent excessive pulse spreading. Such means, for instance, can be repeaters of the type currently used in optical fiber transmission systems. All these considerations are well known to those skilled in the art.

Figure 7:
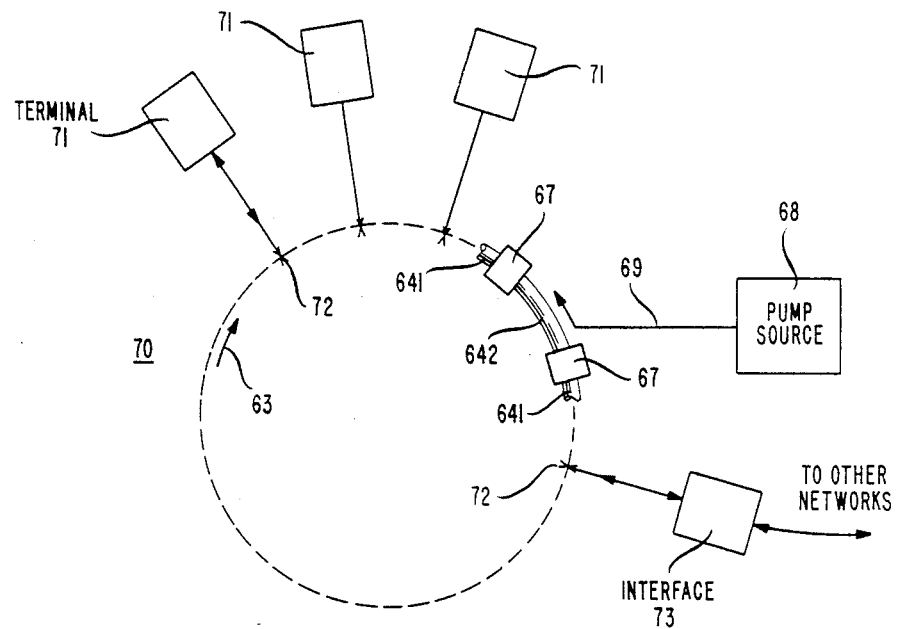
FIG. 7 schematically depicts a further optical fiber communications system with Raman amplification, namely, a ring-configured local area network.

FIG. 7 shows schematically a second exemplary optical fiber communications system according to the invention, namely, a ring-configured local area network 70 that uses Raman amplification to, inter alia, compensate for signal attenuation due to the presence of a multiplicity of taps. The ring transmission path comprises conventional transmission fiber 641 and at least one length of Raman-active fiber 642, coupled to 641 by conventional coupling means 67. A multiplicity of terminals 71 are coupled to the transmission fiber by known means 72, typically taps that permit coupling-in as well as coupling-out of signal radiation. A source 68 of Raman pump radiation is coupled to the Raman-active fiber by known means (not shown). Arrows in FIG. 7 indicate that the pump and signal radiation 63 are counter-propagating; this is exemplary only. It will be understood that a local area network may, if so desired, comprise a connection to the public switched network, or to other private networks. This is indicated by means of the optionally present interface unit 73.

Figure 8:
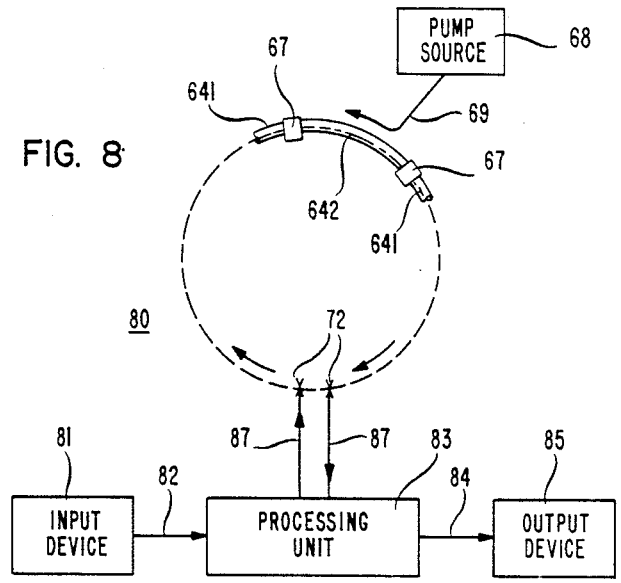
FIG. 8 schematically shows information processing apparatus that comprises an optical fiber information storage loop with Raman amplification.

FIG. 8 schematically illustrates a further exemplary embodiment of the invention, namely, an information processing system 80 with an optical fiber (transient) memory with Raman amplification. Exemplary of such a system is an optical digital computer, or a hybrid (electronic-optical) digital computer. FIG. 8 shows input device 81 providing signals 82 to processing unit 83, which in turn provides signals 84 to output device 85. Coupled to 83 is an optical fiber memory loop, typically comprising transmission fiber 641, as well as comprising at least one length of Raman-active optical fiber 642 according to the invention, coupled together by conventional means 67. Pump radiation source 68 provides pump radiation 69 that is coupled into 642 by known means (not shown). Signal pulses 87 are coupled into the fiber loop by known coupling means 72, circulate one or more times around the loop, are coupled out by similar coupling means 72 and provided to the processing unit 83. Raman amplification of recirculating pulses in a re-entrant fiber loop is disclosed in E. Desurvire et al, *Optics Letters*, Vol. 10(2), pp. 83–85 (1985).

Those skilled in the art will recognize that the inventive Raman-active optical fiber can also be used in a variety of other apparatus, and all such uses are contemplated. Exemplary of such other apparatus are optical fiber sensors, e.g., rotation sensors, accelerometers, strain sensors, thermometers, pressure sensors, magnetometers, and pollution sensors.

What is claimed is:
1. Apparatus comprising
   (a) a source of electromagnetic signal radiation;
   (b) optical fiber means forming a transmission path for the signal radiation from a first fiber location to a second fiber location;
   (c) means for coupling the signal radiation into the fiber at the first fiber location, and signal radiation-responsive means at the second fiber location; and
   (d) signal radiation Raman amplification means comprising a length of a Raman-active optical fiber that forms part of the transmission path for the signal radiation, the Raman-active optical fiber comprising a core and a cladding surrounding the core; characterized in that
at least the core of the Raman-active optical fiber consists of glass comprising
(e) a glass-forming first major component selected from the group consisting of $GeO_2$, $SiO_2$, $AsO_{1.5}$, and combinations thereof; and
(f) a heavy metal oxide second major component selected from the group consisting of PbO, $BiO_{1.5}$, $SbO_{1.5}$, $TlO_{0.5}$, and combinations thereof; and
further characterized in that
the relative Raman cross section for the signal radiation in the Raman-active optical fiber is at least 15; and
(h) the first and second major components together are at least 70 mol% of at least the core.

2. Apparatus of claim 1, wherein the first major component is between about 25 and about 60 mol% of at least the core.

3. Apparatus of claim 2, wherein the second major component consists essentially of $BiO_{1.5}$ and PbO.

4. Apparatus of claim 2, wherein the second major component consists essentially of $SbO_{1.5}$, or of $SbO_{1.5}$ and $BiO_{1.5}$.

5. Apparatus according to claim 2, wherein $SiO_2$ is at most 50 mol% of at least the core.

6. Apparatus of claim 1, wherein the cladding consists of glass comprising the first and second major components, with the first and second major components being at least 70 mol% of the cladding.

7. Apparatus of claim 6, wherein the core and the cladding consist essentially of the first and the second major components.

8. Apparatus of claim 1, wherein the apparatus is an optical fiber communications system.

9. Apparatus of claim 1, wherein the apparatus is an information processing system comprising optical fiber signal storage means comprising a closed loop optical fiber transmission path, with the signal radiation-responsive means being means for coupling out of the fiber at least a portion of the signal radiation.

10. Apparatus of claim 9, wherein the information processing apparatus is a digital computer.

11. Apparatus of claim 1, wherein the apparatus is an optical fiber sensor.

12. Apparatus of claim 11, wherein the optical fiber sensor is a rotation sensor, an accelerometer, a strain sensor, a thermometer, a magnetometer, a pressure sensor, or a pollution sensor.

* * * * *